United States Patent [19]
Johnson

[11] 3,815,438
[45] June 11, 1974

[54] ENERGY ABSORBING STEERING COLUMN ASSEMBLY
[75] Inventor: Jeffrey L. Johnson, Saginaw, Mich.
[73] Assignee: General Motors Corporation, Detroit, Mich.
[22] Filed: Apr. 27, 1973
[21] Appl. No.: 355,264

[52] U.S. Cl............. 74/492, 180/91, 188/1 C
[51] Int. Cl............................... B62d 1/18
[58] Field of Search ......... 74/492, 493; 180/91; 188/1 C; 280/87 A

[56] References Cited
UNITED STATES PATENTS
3,538,785  11/1970  Grancon .................... 74/492
3,590,655  7/1971  Farrell et al. ................ 74/492

*Primary Examiner*—Samuel Scott
*Assistant Examiner*—F. D. Shoemaker
*Attorney, Agent, or Firm*—D. L. Ellis

[57] ABSTRACT

An energy absorbing steering column structure of the type including telescopically related mast jacket tubes and annular rows of deformer balls engaged therebetween with predetermined interference fit is further constructed to enable resetting of the column parts from a normal position to a rearwardly relocated position during vehicle front end impacts or the like. The energy absorbing rolling balls are permitted to freewheel during the resetting and present no resistance to the latter by virtue of being located in pockets in one of the tubes, while under forward collapse of the column the balls roll out of the pockets into full interfering engagement with the tubes to cause energy dissipation therein.

5 Claims, 6 Drawing Figures

PATENTED JUN 11 1974 3,815,438

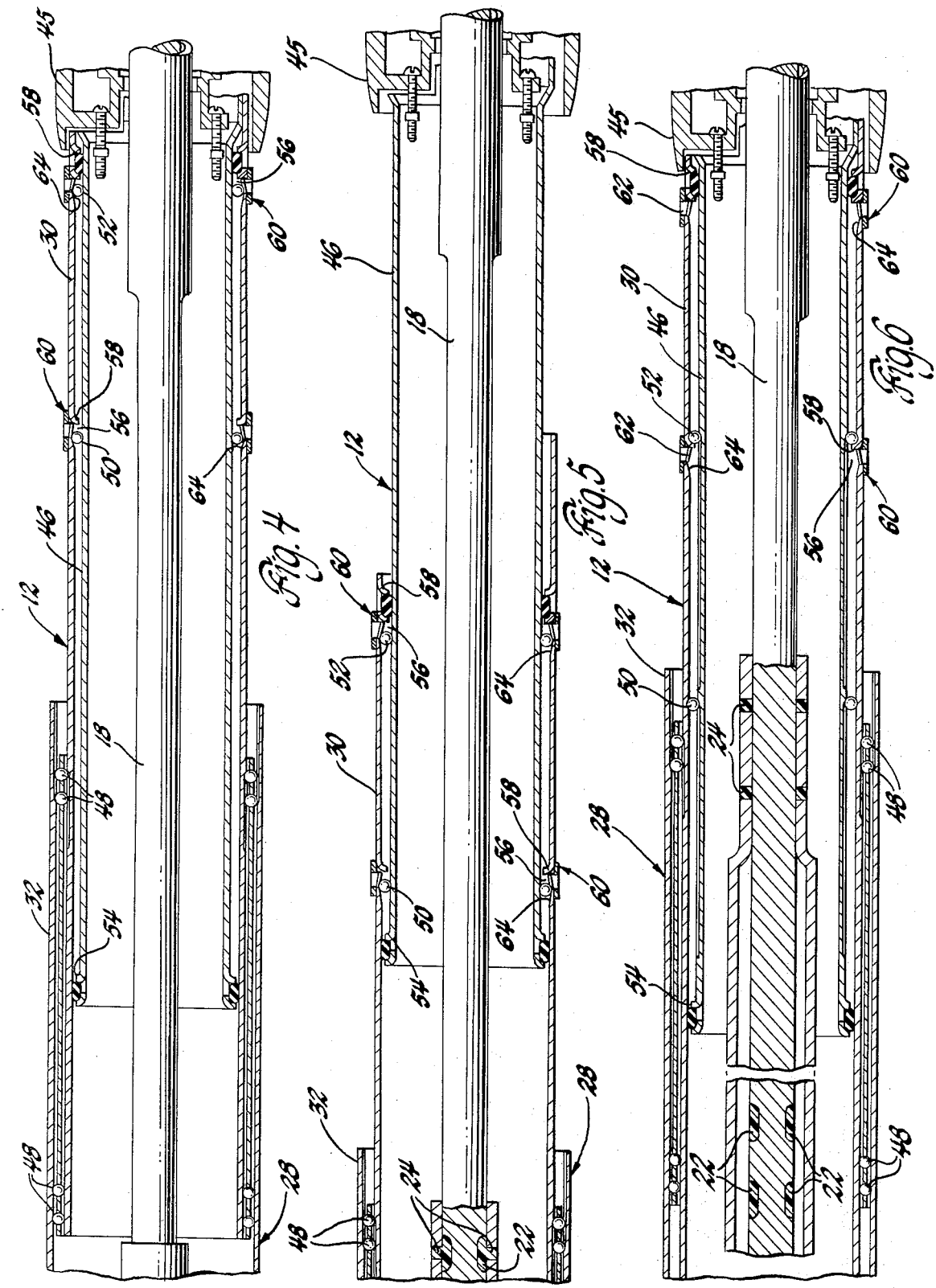

ENERGY ABSORBING STEERING COLUMN ASSEMBLY

This invention relates to devices for absorbing the energy of impacts and more particularly to energy absorbing steering column assemblies and the like for automotive vehicles.

The present invention provides an energy absorbing device adaptable to automotive vehicle body steering columns and like impact energy absorbing structures and being of the type disclosed in U.S. Pat. No. 3,392,599 issued July 16, 1968 to White and assigned to the assignee of the present invention.

Thus, the present energy absorbing device includes a pair of telescopically related members having engaged therebetween with a predetermined interference fit a plurality of rolling bodies or balls having sufficiently high hardness as to be operative during telescopic motion of the members to roll and cause plastic strain grooving or furrowing in the members to absorb the energy of such movement.

The present invention aims to provide improvements in such energy absorbing devices of the foregoing and similar character in respect of allowing relatively free relocation or resetting of the device from an installed or preassembled condition to another relative position so as to meet peculiar operating requirements in the environment in which the energy absorber is intended to function. For example, in the case of energy absorbing steering columns, it has been suggested that the steering wheel or steering instrumentality have the normal operating relationship with respect to the passenger seat during conditions of regular use but in the event of a frontal impact, it would be advantageous to immediately relocate the steering wheel and a portion of the steering column rearwardly closer to the operator a predetermined distance calculated to reduce the velocity with which the operator would subsequently engage the steering wheel during deceleration of the vehicle.

It is a primary feature of this invention that it includes an energy absorbing construction including telescopically related tubular members and rolling bodies as hereinabove described, the rolling bodies being received in pockets in one of the members so as to be normally out of the described interference fit therewith until impact forces applied to the members in one direction relatively move the members and the balls are caused to roll into such interfering engagement ready for energy absorption.

In accordance with an object of the invention, the rolling bodies are adapted to merely freewheel or remain inactive within such pockets during relative movement of the members in an opposite direction allowing resetting of the relative position therebetween and without any substantial resistance from the rolling bodies or otherwise.

Other features of the invention include limit stops on the members to define a maximum amount of such resetting, ramp surfaces positively guiding the rolling bodies into interfering engagement under the application of impact forces, and the use of springs situated within the pockets to assist the rolling bodies in entering their interference fit relationship between the members.

These and other features and advantages of the invention will be readily apparent from the following specification and from the drawings wherein:

FIG. 4 is an enlarged sectional view showing the relationship of parts also represented in FIG. 1;

FIG. 5 is a view similar to FIG. 4 showing a relocated or reset relation of the parts preparatory to an energy absorbing stroke therein; and FIG. 6 is another view similar to FIG. 4 showing the parts after an energy absorbing stroke.

Figure 1:
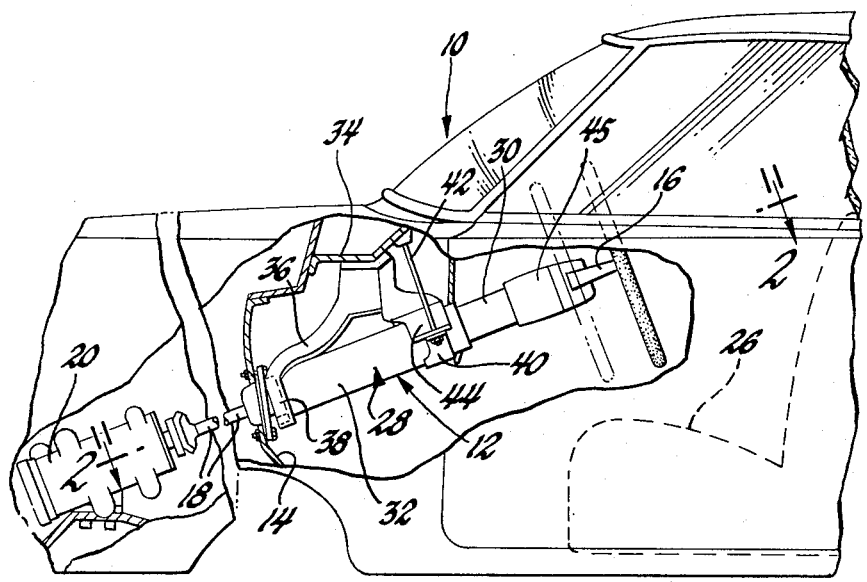
FIG. 1 is a fragmentary partially broken away elevational view of an automotive vehicle body including an energy absorber according to this invention.

Referring now particularly to FIG. 1 of the drawings, the energy absorbing device of the invention is disclosed as being adapted particularly for use in a collapsible steering column assembly 12 in a vehicle body 10. Reference should be had to the above-identified White patent for a basic understanding of the operational principals of the energy absorber of this invention and its adaptability to such steering column usage. Basically, it will be understood that the column assembly 12 is mounted in a passenger compartment portion of the vehicle body 10 rearward of a firewall 14 and in such passenger compartment the column rotatably supports a steering wheel 16 connected with a steering shaft assembly indicated at 18.

As also indicated in FIGS. 4 through 6, and as explained in the White patent and also in U.S. Pat. No. 3,373,629 issued Mar. 19, 1968 to Wight et al. and assigned to the assignee of the present invention, the steering shaft assembly 18 operatively interconnects the steering wheel with the usual steering gear 20 and is preferably comprised of a series of shaft sections, male and female, telescopically joined but relatively nonrotatably interconnected so that steering torque may be sustained entirely therethrough even under impact conditions, but in the event of such conditions the shaft can be shortened to accommodate an energy absorbing displacement of the steering wheel 16 or a rearward displacement of the steering gear. The steering shaft sections may be held in a normal relation by injection molded plastic shear structures 22 including pin portions 24 which are frangible under predetermined moderate force to allow such relative movement of the sections.

Referring again to FIG. 1, the steering wheel is seen as being located in a normal position indicated in solid lines with respect to the operator's seat 26. The steering shaft assembly 18 extends through an opening in the firewall for connection to the steering gear and, as indicated, the steering shaft may be of the type having a considerable length of lower portion beyond the firewall connected to the steering gear. The gear is mounted on the vehicle frame or other support structure ahead of the dirigible wheels of the structure in a position exposing the steering gear to an immediate application of force in the event of a frontal impact, this for purposes later to be described.

The steering column assembly 12 further includes a mast jacket or support subassembly 28 comprised of upper and lower cylindrical mast jacket sections 30 and 32. The lower section 32 is mounted upon cowl structure 34 of the vehicle body by way of a combination of steering column support brackets including one element 36 extending forwardly and downwardly from the cowl to encircle and be rigidly affixed to the lower section 32 at 38 and another element connecting with the upper end of section 32 via a bracket 40 affixed to such section. Additionally, the brackets 36 may be reinforced by use of hangar bolts 42 depending from cowl 34 and extending through the brackets and a transverse instrument panel tie bar 44, all as is well-known in the art.

Figure 2:
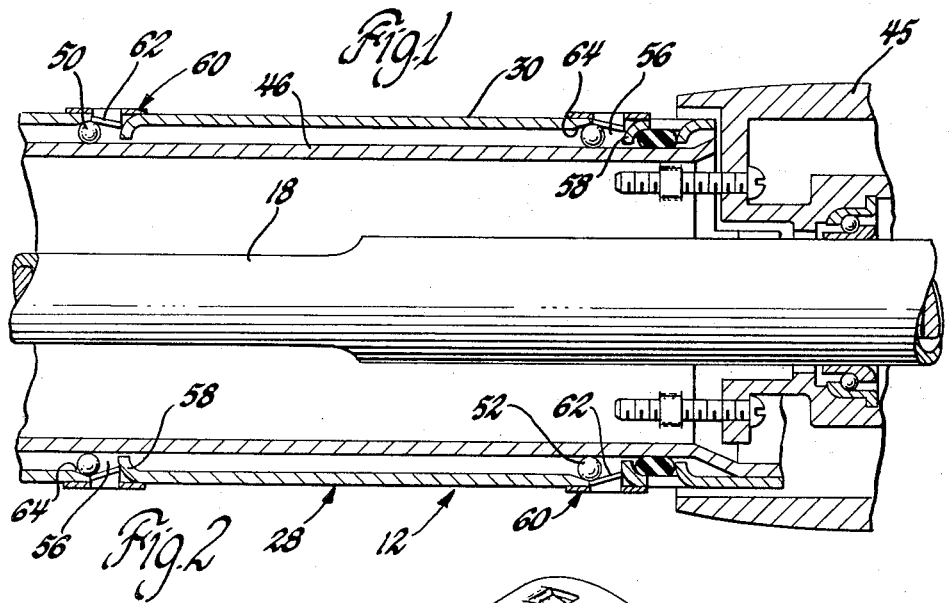
FIG. 2 is an enlarged sectional view of a portion of the energy absorber taken along the plane indicated by lines 2—2 of FIG. 1.

An upper die cast support head 45 is secured to mast jacket 28, as by self-tapping screws, FIG. 2, and includes the usual ball bearing for rotatably supporting the upper end of the steering shaft and the steering wheel 16. A similar bearing is provided for the shaft at the lower end of the mast jacket 28.

Referring to FIG. 4, upper and lower sections 30 and 32 are among the members constituting a first energy absorbing portion of the steering column assembly. A second energy absorbing portion is constituted by the upper section 30 and a third or inner tubular member 46 located within upper section 30. It is to this inner tube 46 that die cast head 45 is attached so that thrust loads on steering wheel 16 are also directed to the inner tube. The first energy absorbing portion constituted of sections 30 and 32 is generally identical to that as disclosed in the White patent in that it includes a plurality of annular rows of rolling bodies or balls 48 engaged between the juxtaposed surfaces of the sections with a predetermined interference fit. As explained in the White patent, the balls are selected generally to have a hardness of at least two and one-half times the hardness of the sections 30 and 32 or one of them, so that under relative telescopic motion therebetween from such a position as shown in FIG. 4, the balls will roll and cause longitudinally extending furrows or highly localized plastic strain grooving in the walls.

The second energy absorbing portion of the steering column of the assembly, including the upper section 30 and the inner tube 46, includes a further set of rolling bodies arranged in at least two annular rows 50 and 52. As set forth in the White patent, balls 50 and 52 are also selected in size and hardness to achieve a required interference fit between the walls of their associated tubes and cause the localized plastic strain grooving arising from rolling of the balls over such walls.

The second energy absorbing portion is constructed to be relocatable or resettable from the position thereof shown in FIG. 4 to the position shown in FIG. 5, wherein the steering wheel 16, inner tube 46, die cast head 45 and the steering shaft assembly 18 have been moved relative to sections 30 and 32 rearwardly some predetermined distance closer to the passenger seat. The predetermined distance is limited to a maximum defined by the engagement of a plurality of limit tabs 54 on the inner end of tube 46 with the annular row of balls 50, as will be explained hereinbelow. This rearward relocation of the steering wheel has been suggested as useful to reduce the velocity with which the passenger or operator would strike the steering wheel after a primary collision on the forward structural portion of the vehicle body 10. By using the first few milliseconds of the primary collision force deformation that takes place in this part of the vehicle, the steering wheel 16 can be located closer to the operator's torso than is required for normal condition, so that by the time the operator experiences significant relative movement within the passenger compartment, the steering wheel will be in a position to not only reduce the build up of his relative velocity occuring before engagement therewith but a greater distance of energy absorbing excursion of the column will be available to the operator once there is such engagement so as to expend the energy of his movement over a greater distance and perhaps with lesser total force required to be sustained in the steering column assembly. To this end, several suggestions in the patented art on deployment of passenger restraint systems may be useful. For example, reservoirs of compressed gas, explosive charges, etc., all may be useful in deploying or resetting the steering wheel 16 and associated inner tube and steering shaft parts to the position shown in FIG. 5. In such case, shearing of pins 24 in the steering shaft would occur by design. Alternatively, the forward location of the steering gear 20 and its exposure immediately to high forces causing front structural portion crush may be employed such that the rearward displacement of the steering gear that is occasioned during such crush may be transmitted rigidly through the steering shaft assembly 18 and to the steering wheel 16 and associated parts to accomplish the relocation shown in FIG. 5. In this case, the shear pins 24 would sustain a predetermined required force to accomplish this rigid unitary movement. At the limit of such rearward displacement of the steering wheel, the tube 46 on which the steering wheel is mounted will engage its limit stop tabs 54 with the annular row of balls 50 and any further travel of the steering gear and the lower portion of the steering shaft assembly will result in shearing of the shear pins 24 and foreshortening of the steering shaft assembly.

Figure 3:
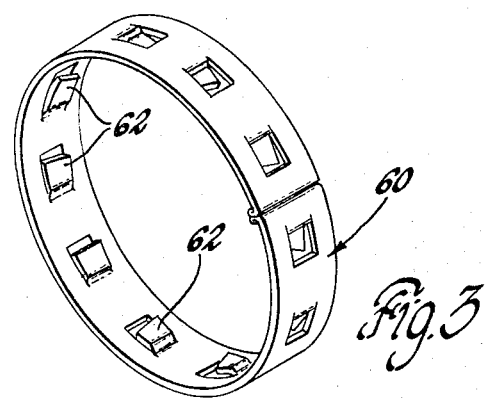
FIG. 3 is a perspective view of a spring ring utilized within the energy absorber of the invention.

The rows of balls 48 and 50 accommodate such relocation of tube 46 along with the steering wheel in accordance with a feature of this invention. Each of such balls are located in a pocket 56 which is formed in the wall of upper section 30 by lancing or other suitable expedient which provides a tab 58 extending radially inwardly from the wall and a window or aperture adjacent such tab in that wall. Tabs 58 serve to back up balls 50 where engagement of the limit tabs 54 on the balls occurs during resetting. Overlying the outer surface of the upper section 30 over the pocket windows or apertures is a ring 60, best viewed in FIG. 3, spot-welded or otherwise retained on the upper section and formed with a series of L-shaped bent fingers 62 receivable in the several apertures so as to register each finger with a respective ball 50 or 52. As best viewed in FIG. 2, the fingers are provided at their free legs with a predetermined inclined disposition with respect to the longitudinal axis of the upper section 30 so that, when engaging its respective ball, the finger provides least resistance to such engagement when the ball is at the left margin of the pocket in which the finger resides. The ring 60 is of a sufficiently springy sheet metal or the like so that a predetermined amount of flexure and resilience will occur in the spring fingers under forced rightward rolling movement of the balls 48 and 50 during the rightward resetting displacement of the inner tube 46 that occurs in its change of position from that of FIG. 4 to that of FIG. 5. In other words, the ball in each pocket is permitted to rise sufficiently from any tendency toward wedging engagement between the tube and the spring finger as to allow relatively free rightward movement of the tube. Once the tube 46 has reached the position of FIG. 5, however, and during a subsequent leftward movement of the inner tube 46 under the engagement of the operator's torso with the steering wheel, the spring fingers aid in rolling the balls 50 and 52 in a leftward direction. The balls are urged to the position shown in FIG. 5 where the outer regions of the balls are engaged with the ends of ramp like surfaces 64 formed in the wall of upper section 30 to merge with respective ball pocket windows therein. Continued forcible displacement of tube 46 leftwardly will cause the balls 50 and 52 to roll over these ramps and into full interfering engagement with the wall of upper section 30, thereby to provide energy absorption. This energy absorbing excursion of tube 46 continues, assuming sufficient energy is imparted until a relationship of inner tube 46 and upper section 30 is attained as shown in FIG. 6. There, the die cast head 45 is bottomed on upper section 30 so that thereafter a second stage of energy absorption is available to consume whatever remaining energy need be dissipated. The remaining force is applied directly from steering wheel 16 to upper section 30 so as to begin the localized deformation of the outer surface of the upper section 30 and the inner surface of lower section 32 that will arise by rolling of the balls 48. It will of course be observed that if, for any reason, the described resetting of steering wheel 16 does not occur during impacts, the operator can nevertheless be afforded adequate impact protection by use of the first energy absorbing portion of the column including sections 30 and 32.

Having thus described the invention, what is claimed is:

1. An energy absorber comprising a pair of telescopically related tubular members movable relative to each other upon the application of force thereto and a plurality of rolling bodies adapted for engagement between said members with a predetermined interference fit and having a hardness sufficiently higher than said members as to be operative to roll during inward telescoping movement therebetween to cause predetermined plastic deformation therein to absorb the energy of such movement, means defining rolling body pockets in the wall of one of said members receiving said rolling bodies out of said predetermined interference fit whereby movement of said members in a direction opposite said inward movement may proceed substantially freely of any resistance from said rolling bodies, and means responsive to movement of said members in said inward direction for moving said rolling bodies out of said pockets and into said predetermined intereference fit engagement between said members to absorb the energy of such movement in said inward direction.

2. An energy absorber recited in claim 1 wherein the last mentioned means comprises ramp surfaces formed in the wall of said one member merging with said pockets therein.

3. An energy absorber as recited in claim 1 further including spring means situated in said pockets in engagement with said rolling bodies and operative to urge the latter to travel into said interference fit engagement between said members on movement thereof in said inward direction.

4. An energy absorber comprising, a pair of telescopically related tubular members movable relative to each other upon the application of force thereto and a plurality of rolling bodies adapted for engagement between juxtaposed surfaces of said members with a predetermined interference fit and having a hardness sufficiently higher than said members as to be operative to roll during inward telescoping movement therebetween to cause predetermined plastic deformation therein to absorb the energy of such movement, means defining rolling body pockets in the wall of one of said members receiving said rolling bodies out of said predetermined interference fit whereby movement of said members in a direction opposite said inward movement may proceed substantially freely of any resistance from said rolling bodies, a plurality of ramp surfaces in said one member each respective to a said pocket and extending therefrom to the said engagement surface of such member for enabling movement of said rolling bodies out of said pockets and into said predetermined interference fit engagement between said members, and spring means in said pockets resiliently yieldable to provide accommodation of said rolling bodies in said pockets and biasing said rolling bodies out of the latter to roll over said ramp surfaces and into said interference fit engagement upon relative movement between said members in said inward direction.

5. In an automotive vehicle including a forward portion thereof subject to impacts and a passenger compartment having therewith an operator's seat and a manual steering instrumentality adapted for mounting adjacent said seat, an energy absorbing steering support system comprising a support structure in said passenger compartment portion, a pair of relatively movable support members mounted on said support structure and in turn supporting said steering instrumentality in a normal operating position with respect to the operator's seat and for movement both forwardly from said normal position and rearwardly a predeterminedly limited distance from said normal position, whereby said instrumentality and one of said support members are capable of being relocated relative to the other support member rearwardly from said normal position closer to said seat in the event of impacts on said forward vehicle portion and where forward thrust of the operator's torso into engagement with said instrumentality is accommodated by forward movement of the latter with said one support member from any such relocated position, and energy absorbing means associated with said support members and operative substantially without resistance to permit said relative movement therebetween and movement of said instrumentality rearwardly to said relocated position of the latter and operative under relative movement of said members and movement of said instrumentality forwardly of the vehicle under engagement of the operator's torso on the steering instrumentality to provide controlled resistance to such movement and absorb the energy thereof.

* * * * *